3,085,016
COLOR IMPROVEMENT OF PEANUT BUTTER
Dwight R. Merker, Chicago, Ill., assignor to Swift & Company, Chicago, Ill., a corporation of Illinois
No Drawing. Filed Mar. 13, 1959, Ser. No. 799,071
8 Claims. (Cl. 99—128)

The present invention relates to peanuts and peanut products having an improved color and to the method of producing these peanuts and peanut products.

It is the conventional practice in the production of products made from peanuts, such as peanut butter, to roast shelled peanuts at a temperature of 120° to 170° C. for 15 to 20° minutes prior to the blanching operation. After the peanuts are blanched they are ground and mixed with the desired amounts of stabilizer, salt, and sugar. The purpose of the roasting operation is to remove moisture, to produce the characteristic flavor, and also to develop color in the peanuts. The color imparted to the peanuts is a dull brown. It would be desirable from the standpoint of producing a more appetizingly attractive and salable product if the color of the peanut butter produced from the roasted peanuts were deeper and more intense. However, attempts to produce an improved color by additional roasting have been unsuccessful. The color is not improved to any great extent and the over-roasting generally results in an undesirable burnt flavor.

The development of color in roasted peanuts is believed to be the result of a nonenzymatic browning reaction between the sucrose and amino acids which are natural constituents of the peanuts. Attempts have been made in the past to simulate a normal roast at lower temperatures. In one process raw blanched split peanuts are soaked in a solution of reducing sugar in aqueous amino acid. After drying to approximately the original weight, the peanuts were roasted at 100–120° C. However, with this procedure flavor was found to be dependent on the added amino acid. Furthermore, the solute, i.e. the reducing sugar, did not penetrate the nuts to any great extent. Thus, it appears that to date no suitable solution to the problem of producing an improved color in peanuts and peanut products has been found.

It is therefore an object of my invention to produce a desirable reddish-brown color in peanuts and peanut products.

Another object of my invention is to produce a peanut butter which does not possess a burnt flavor but which has imparted thereto a deep reddish-brown color.

A further advantage of this invention is to provide a peanut product such that flavor and color is not dependent upon added amino acids.

A still further object and advantage of my invention is to provide a method for producing a greatly improved color in normal and lightly roasted peanuts.

Another object is to provide a method of producing a peanut butter product having a desirable reddish-brown color.

Further objects and advantages will become apparent from reading the following description of the invention.

Reducing sugars are not natural constituents of the peanut (at least, there is only a questionable 0.01% therein). From time to time such sugars have been used as sweeteners in peanut formulations replacing the more expensive sucrose. In such cases the reducing sugars are added to the formulations at a temperature of from 40–90° C.

I have discovered that there is a vast improvement in the color of peanuts and peanut products such as peanut butter if lightly roasted peanuts are heated to an elevated temperature in the presence of a reducing sugar. By treating in this manner a desirable reddish-brown color is imparted to the peanuts and to products prepared from the peanuts, such as peanut butter. By practicing my method the improved color is imparted to the peanuts at lower temperatures and in less time than are employed in the normal roast. No undesirable burnt flavor is produced in the product. This treatment may be carried out in a mixing tank, a rotator, or other suitable apparatus utilized in processing peanut butter. It is, of course, possible to treat the peanuts separately and later mix them with other ground peanuts and/or the other peanut butter ingredients.

With respect to the starting material, I have found that any combination of ground or unground, blanched or unblanched peanuts is effectively treated and will attain the desirable color when processed in accordance with my method.

I have found that if the reducing sugar and the peanuts are heated in the presence of a small amount of added water, the reducing sugar and peanut protein will react to produce the improved color at lower temperatures and in less time.

In the practice of the method of this invention, it has been observed that for any given amount of a particular reducing sugar the color that develops increases in intensity in direct relationship to the time of reaction (as affected by the temperature at which the reaction is carried out). It is possible to determine the end point of the reaction producing the improved color by analytical tests for the disappearance of sugar or, preferably, by color standards. The reaction can be stopped when a desirable color has been produced and before the maximum color intensity is reached by quickly chilling the heated product to below 90° C. The temperature to which the peanut protein and reducing sugars are heated depends on the speed of the reaction and the amount and type of reducing sugar employed. In general, higher temperatures promote the development of the color in a shorter period of time than do lower temperatures.

I have found that temperatures of from about 100° C. to about 170° C. and times of reaction of from several minutes to about an hour are particularly good conditions for reacting the peanuts with the reducing sugars to produce the desirable reddish-brown color. Some of the reducing sugars react more quickly and produce a more intense color. When employing those sugars the time of reaction and/or the temperature can be decreased or the amount of sugar employed can be decreased, but this is a matter of choice and determination when practicing the invention. The reactivity of a sugar for the development of color appears to be related not only to its functionality but also to its melting point.

Broadly, from about 0.25–25% reducing sugar by weight of the peanut butter can be used when a complete peanut butter product is to be prepared. A portion of this sugar may or may not serve as the sweetening agent. If it is desired to prepare a base mixture of ground peanuts in which the color is developed to a maximum intensity and portions of this mixture are subsequently added to batches of peanut butter to impart the desirable degree of color thereto, small amounts of the sugar, e.g. less than 5.0% based on the weight of the final product, are required. Amounts much in excess of those mentioned herein while effective are not economical and are therefore not used.

Any reducing sugar will be effective in varying degrees in the method of this invention. The monosaccharide reducing sugars are considerably more active than the disaccharides. The disaccharide reducing sugars, e.g. cellobiose, lactose and maltose do not react in the absence of moisture or undesirably high temperatures. The reaction does not proceed readily even in the presence of moisture.

Thus, for practical reasons the monosaccharide reducing sugars (the aldo- and keto-pentoses and aldo- and keto-hexoses) would be used. Examples of monosaccharides which readily react with the peanut protein to produce a desirable reddish-brown color in the peanuts are arabinose, gelactose, mannose, glucose and fructose or mixtures thereof. Invert sugar, corn syrup and honey are particularly effective sources of the reducing sugars. As was previously mentioned, the amount of sugar to be added depends on whether the sugar is being used as the sweetening agent for the peanut butter as well as for color. If it is used as a sweetener the amount will depend primarily upon flavor requirements as lesser amounts are necessary for good color development.

It is therefore evident that there are wide variable ranges of time, temperature and ingredients, and it is deemed within the skill of one component in the art to choose the particular satisfactory conditions he wishes to employ.

The following examples are merely illustrative and should not be construed as placing limitations on the invention other than as set forth in the appended claims.

In these examples reference is made to a desirable reddish-brown color. The color which is attained in the product by practicing my method is variable, depending upon the factors already described, and also on the particular variety of peanut employed. In general, the reddish-brown color which is deemed desirable will range between Plate 12 (9A–12L) to Plate 13 (9A–12L), as shown in Maerz and Paul's Dictionary of Color, McGraw-Hill Book Company, Inc., New York city, 1930.

*Example I*

Eight hundred grams of ground, roasted peanuts were mixed in a stainless steel beaker with 30 grams of glucose, 40 grams of corn syrup, 15 grams of salt and 20 grams of peanut hard fat. The mixture was heated with agitation to 140° C. for 5 minutes. The reddish-brown color developed rapidly after several minutes. When the color had reached the desired intensity, the reaction was stopped by quickly chilling the mixture in an ice bath.

*Example II*

In order to test the relative effectiveness of various reducing sugars to develop a deeper color in peanut butter, samples of peanut butter were given identical heat treatment with the following reducing sugars or mixtures thereof:

Glucose
Glucose plus water
Corn syrup
Strained honey
Invert sugar

The samples were heated for 40 minutes at an average temperature of 110° C. and the colors compared with a light and dark standard for peanut butter coloring. A control sample which contained 2.5% glucose was given no heat treatment. The following results were obtained:

| Sample | Formula | Color-Plate |
|---|---|---|
| 1 | 2½% glucose (Control—no heat treatment) | 12-8-G |
| 2 | 2½% glucose | 12-10-I |
| 3 | 2½% glucose, 1% added water | 12-11-E |
| 4 | 2½% glucose, 6% corn syrup | 12-11-E |
| 5 | 7½% glucose | 12-11-E |
| 6 | 2½% glucose, 6% honey | 13-12-A |
| 7 | 2½% glucose, 6% invert sugar | 13-12-A |

None of the samples contained a burnt or over-roasted peanut flavor. The increased color development in samples 6 and 7 is believed to be due to the presence of fructose in honey and invert sugar.

*Example III*

A batch of ground peanuts was divided into 3 lots. Each lot was given identical treatment in an open kettle at temperatures just above 100° C. D-galactose was used as the reducing sugar in one lot, L-arabinose in another and mannose in the third. These sugars readily reacted with the peanuts to produce a desirable reddish-brown color.

*Example IV*

To show the varying reactivity of the sugars, batches of peanut butter containing 5%, by weight, of one of several reducing sugars were heated at 115° C. and the time required to produce an intense reddish-brown color was determined. The following tabulation sets out the results found:

Sugar— Reaction time
   DL-glucose _____ 15 minutes.
   L-arabinose _____ 30 minutes.
   D-galactose _____ 30 minutes.
   Cellobiose _____ No reaction (at this temperature).
   Lactose _____ No reaction (at this temperature).
   Sucrose (not a reducing sugar) _ No reaction.

*Example V*

In order to determine the effect obtained by adding water, 5% glucose, based on the weight of the peanut butter, was added to one sample of peanut butter; and 5.5% glucose solution by weight of the peanut butter and prepared on the basis of 90 parts glucose to 10 parts water was added to a second sample of peanut butter. The samples were elevated in temperature to 105° C. The sample containing the additional moisture developed an intense reddish-brown color (approximating the color of plate 12-11-E) after 30 minutes whereas 60 minutes was required to develop the same degree of color in the peanut butter which contained only the added glucose.

*Example VI*

The following mixtures of peanut butter and reducing sugars were heated to the degree and for the time noted to develop an intense reddish-brown color:

| Amount of Reducing Sugar | Temperature, °C. | Time, minutes |
|---|---|---|
| 5% | 110 | 15 |
| 2.5% | 110 | 40 |
| 0.5% | 110 | 60 |

The term "peanut butter" as used herein is the comminuted food product prepared from peanuts by grinding mature roasted peanut kernels from which the majority of seed coats have been removed. Seasoning or stabilizing ingredients or ingredients of nutritive value may be added to the product. This definition is in accordance with the United States Department of Agriculture, Agricultural Marketing Administration, United States Standards for Grades of Peanut Butter (Effective September 1, 1942).

Obviously many modifications and variations of the invention as hereinbefore set forth may be made without departing from the spirit and scope thereof, and therefore only such limitations should be imposed as are indicated in the appended claims.

I claim:

1. A process for improving the color of roasted peanuts comprising: forming a mixture of monosaccharide reducing sugar with roasted peanuts; heating said mixture to a temperature between about 100° C. and about 170° C.; and maintaining said mixture at said temperature for a time sufficient to impart a desirable reddish-brown color to said peanuts.

2. A process for improving the color of roasted peanuts comprising: forming a mixture of monosaccharide reducing sugar with roasted peanuts; heating said mixture to a temperature between about 100° C. and about 170°

C.; and maintaining said mixture at said temperature for a period from about five minutes to about sixty minutes.

3. The process of claim 2 wherein the heating is carried out in the presence of added water.

4. The process of claim 3 wherein the roasted peanuts are ground.

5. A process for improving the color of peanut butter comprising: forming a mixture of monosaccharide reducing sugar with ground roasted peanuts, the amount of said sugar being from about 0.25% to about 25% by weight of the final product; heating said mixture to a temperature between about 100° C. and about 170° C.; and maintaining said mixture at said temperature for a time sufficient to impart a desirable reddish-brown color to said peanut butter.

6. A process for improving the color of roasted peanuts comprising: forming a mixture of monosaccharide reducing sugar with roasted peanuts, the amount of said sugar being from about 0.25% to about 25% by weight of the final product; heating said mixture to a temperature between about 100° C. and about 170° C.; maintaining said mixture at said temperature for a period from about five minutes to about sixty minutes; and reducing said mixture to a temperature below about 90° C.

7. The process of claim 6 wherein the roasted peanuts are ground.

8. The process of claim 7 wherein the heating is carried out in the presence of added water.

References Cited in the file of this patent

UNITED STATES PATENTS 1,756,702    Rosenfield _____ Apr. 29, 1930

OTHER REFERENCES

"Siebel's Manual for Bakers and Millers," second edition, published by the Siebel Institute of Technology, Chicago, 1924, page 60.